United States Patent
Liu et al.

(10) Patent No.: US 12,447,349 B2
(45) Date of Patent: Oct. 21, 2025

(54) BRAIN-COMPUTER INTERFACE SYSTEM

(71) Applicants: IMEC VZW, Leuven (BE); Stichting IMEC Nederland, Eindhoven (NL)

(72) Inventors: Yao-Hong Liu, Eindhoven (NL); Barundeb Dutta, Leuven (BE)

(73) Assignees: IMEC VZW, Leuven (BE); Stichting IMEC Nederland, Eindhoven (NL)

( * ) Notice: Subject to any disclaimer, the term of this patent is extended or adjusted under 35 U.S.C. 154(b) by 453 days.

(21) Appl. No.: 17/546,616

(22) Filed: Dec. 9, 2021

(65) Prior Publication Data
US 2022/0176136 A1 Jun. 9, 2022

(30) Foreign Application Priority Data
Dec. 9, 2020 (EP) .................................. 20212668

(51) Int. Cl.
*A61N 1/00* (2006.01)
*A61B 5/00* (2006.01)
(Continued)

(52) U.S. Cl.
CPC ........ *A61N 1/37252* (2013.01); *A61B 5/4064* (2013.01); *A61B 5/6803* (2013.01);
(Continued)

(58) Field of Classification Search
CPC .... A61N 1/37252; A61N 1/0529–0539; A61N 1/3787; A61N 1/37223;
(Continued)

(56) References Cited

U.S. PATENT DOCUMENTS 5,733,313 A * 3/1998 Barreras, Sr. ........ A61N 1/3787
128/903
7,894,904 B2 * 2/2011 Cowan ............... A61N 1/36071
607/45
(Continued)

FOREIGN PATENT DOCUMENTS

WO 2011084788 A2 7/2011
WO 2012143850 A1 10/2012

OTHER PUBLICATIONS

Seo, Dongjin, Jose M. Carmena, Jan M. Rabaey, Elad Alon, and Michel M. Maharbiz. "Neural dust: An ultrasonic, low power solution for chronic brain-machine interfaces." arXiv preprint arXiv:1307.2196 (2013).
(Continued)

*Primary Examiner* — Scott M. Getzow
(74) *Attorney, Agent, or Firm* — MCDONNELL BOEHNEN HULBERT & BERGHOFF LLP

(57) ABSTRACT

The present disclosure relates to a brain-computer interface system and method. In an example, a brain-computer interface system includes a data processing unit, a data transceiver unit, and a sensing or stimulation unit. The system also includes a first communication path between the data transceiver unit and the sensing or stimulation unit including a first downlink channel for transmitting power and data from the data transceiver unit to the data sensing unit and a first uplink channel for transmitting data from the sensing or stimulation unit to the data transceiver unit. The system may additionally include a second communication path between the data processing unit and the data transceiver unit including a second downlink channel for transmitting power and data from the data processing unit to the data transceiver unit and a second uplink channel for transmitting data from the data transceiver unit to the data processing unit.

17 Claims, 9 Drawing Sheets

(51) Int. Cl.
*A61N 1/05* (2006.01)
*A61N 1/372* (2006.01)
(52) U.S. Cl.
CPC ....... *A61N 1/0529* (2013.01); *A61N 1/37223* (2013.01); *A61N 1/37247* (2013.01)
(58) Field of Classification Search
CPC .............. A61N 1/37247; A61B 5/4064; A61B 5/6803; A61B 5/37; A61B 5/4836; A61B 5/6868
See application file for complete search history.

(56) References Cited

U.S. PATENT DOCUMENTS

| | | | | |
|---|---|---|---|---|
| 11,589,790 | B2 * | 2/2023 | Constandinou | A61N 1/37229 |
| 2003/0067889 | A1 * | 4/2003 | Petite | H04W 4/14 |
| | | | | 370/310 |
| 2009/0112277 | A1 | 4/2009 | Wingeier et al. | |
| 2010/0079156 | A1 * | 4/2010 | Lee | A61B 5/24 |
| | | | | 324/692 |
| 2012/0109236 | A1 * | 5/2012 | Jacobson | A61N 1/368 |
| | | | | 607/32 |
| 2013/0204316 | A1 | 8/2013 | Carpentier et al. | |
| 2014/0194944 | A1 | 7/2014 | Romanelli et al. | |
| 2014/0296646 | A1 | 10/2014 | Wingeier et al. | |
| 2014/0379041 | A1 * | 12/2014 | Foster | A61N 1/37205 |
| | | | | 607/2 |
| 2017/0360364 | A1 * | 12/2017 | Heasman | A61B 5/24 |
| 2018/0289969 | A1 * | 10/2018 | Malekkhosravi | A61N 1/37223 |
| 2020/0064920 | A1 * | 2/2020 | Soltani | G01S 13/0209 |
| 2022/0095992 | A1 * | 3/2022 | Guvenc | A61B 5/6868 |

OTHER PUBLICATIONS

Hong, Guosong, and Charles M. Lieber. "Novel electrode technologies for neural recordings." Nature Reviews Neuroscience 20, No. 6 (2019): 330-345.

* cited by examiner

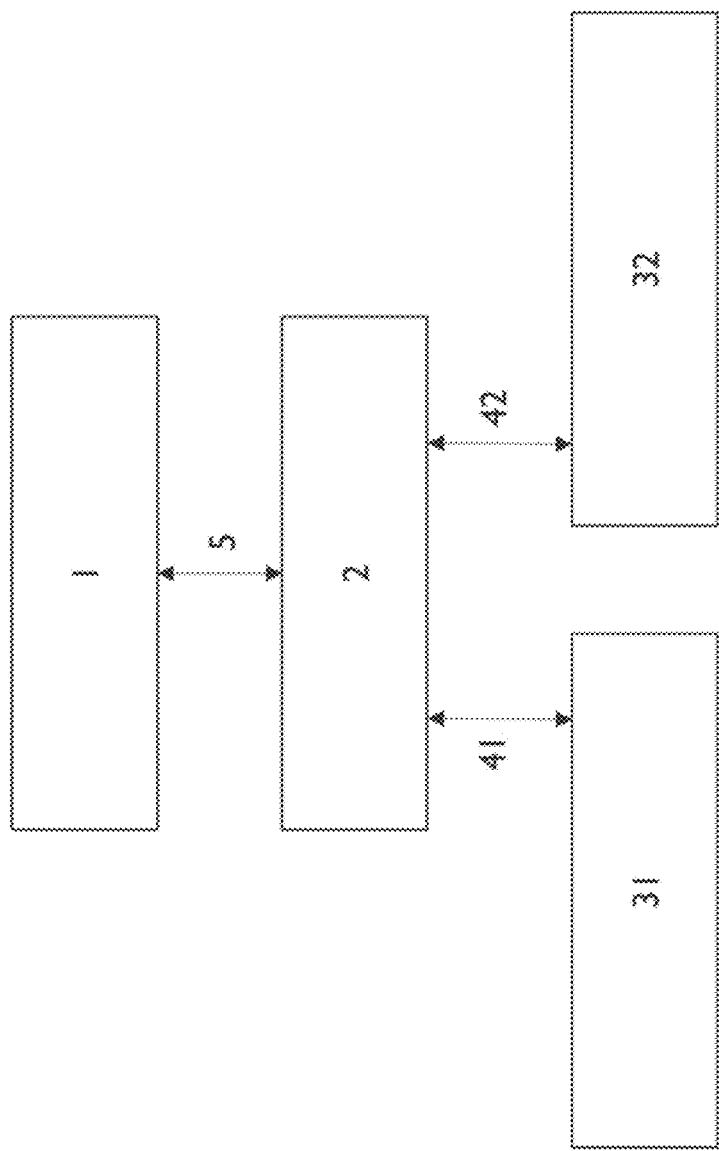

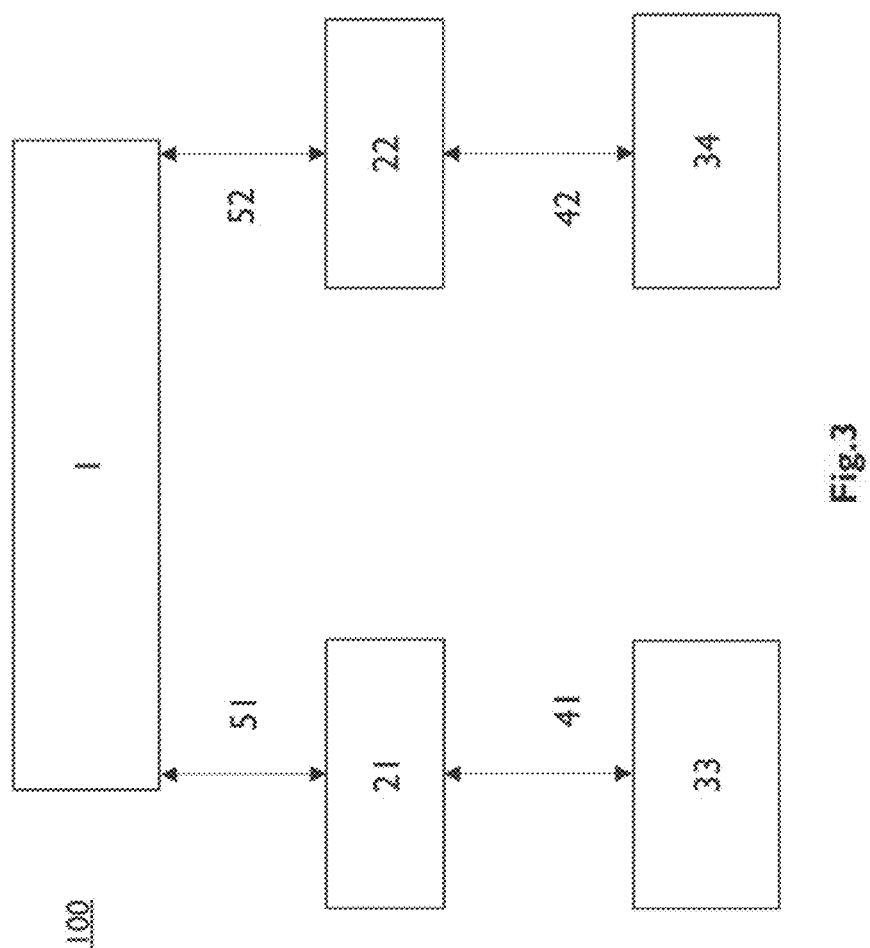

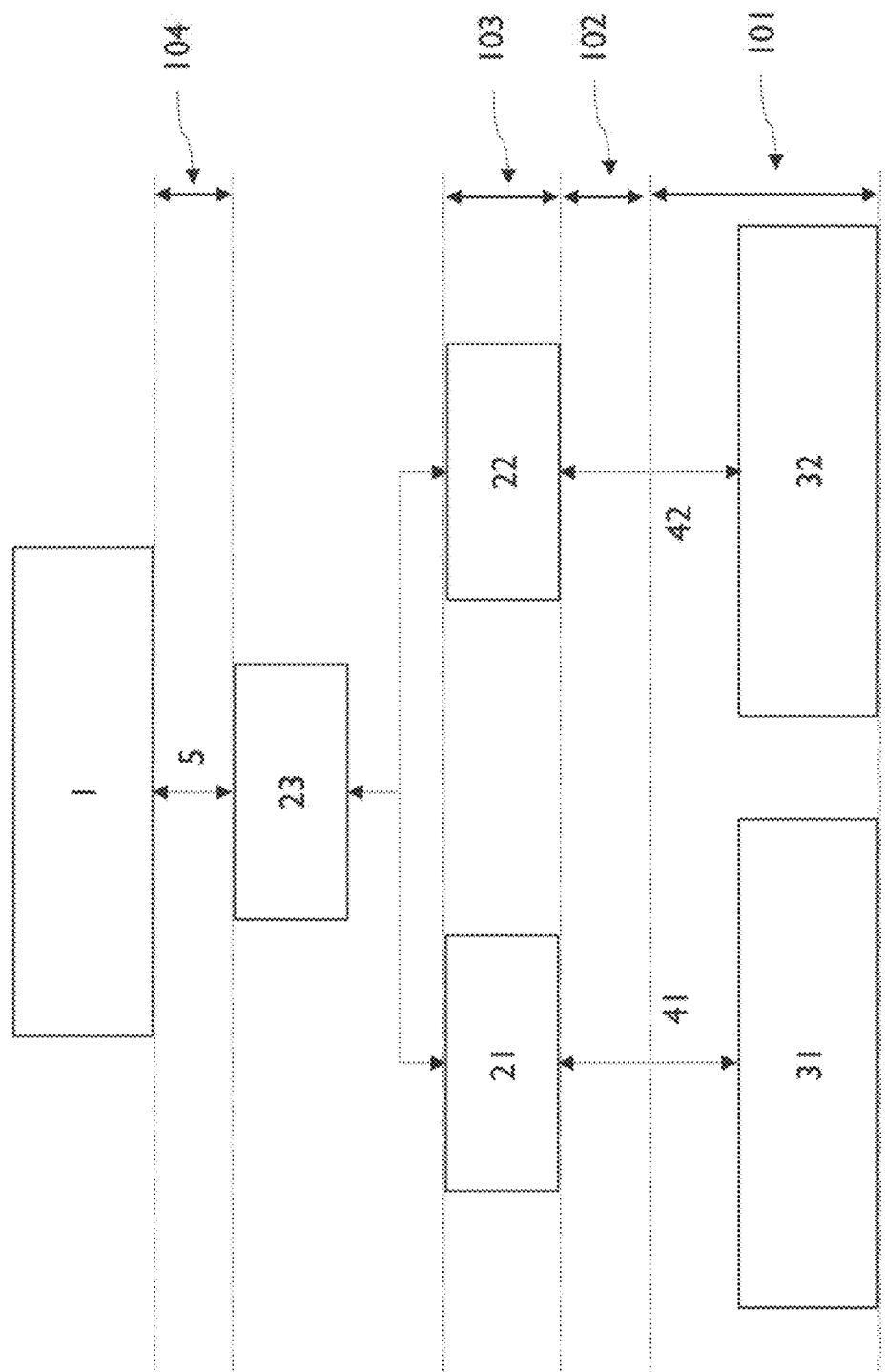

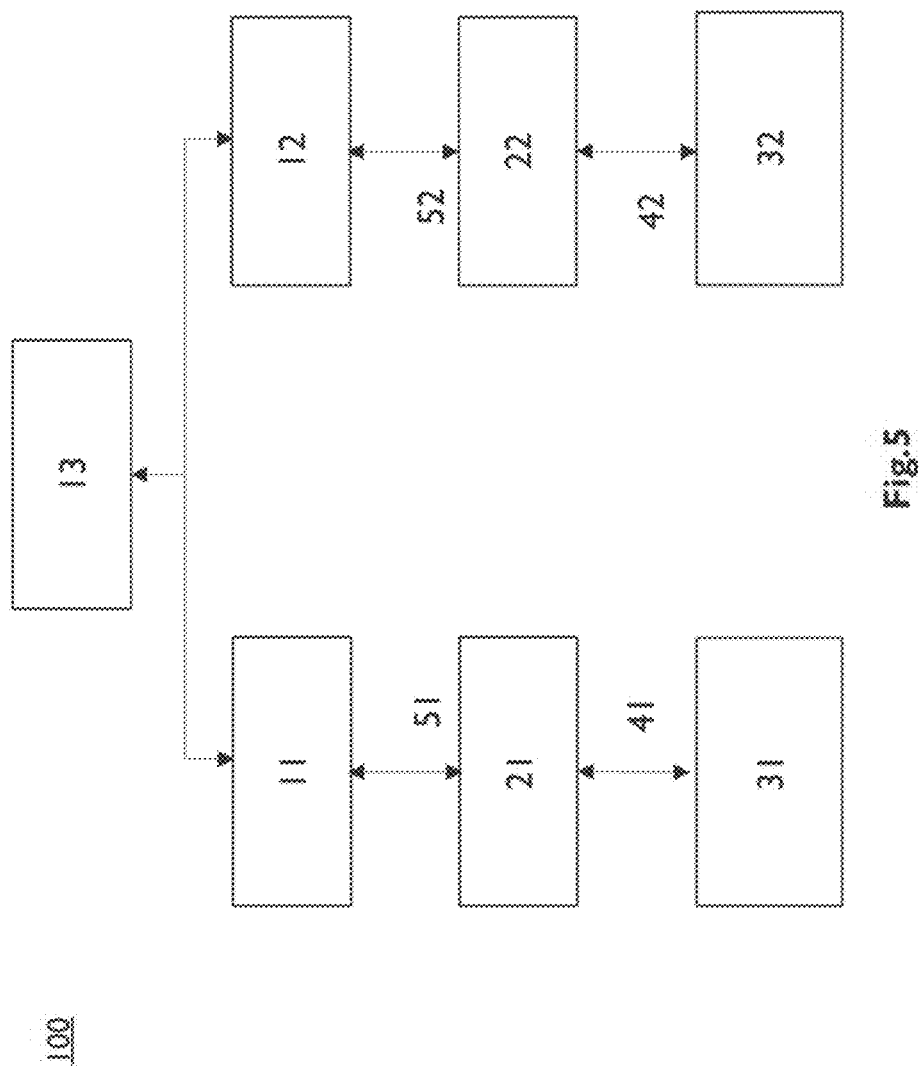

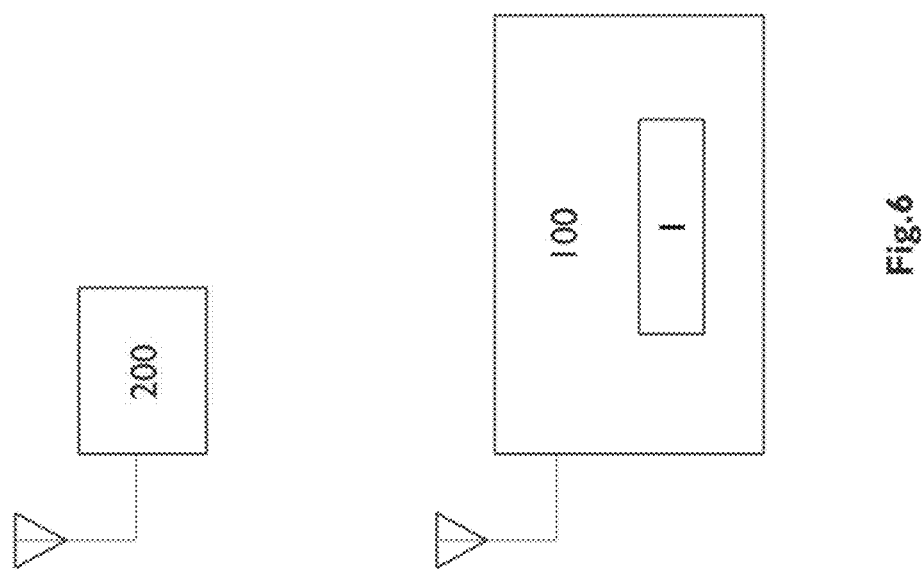

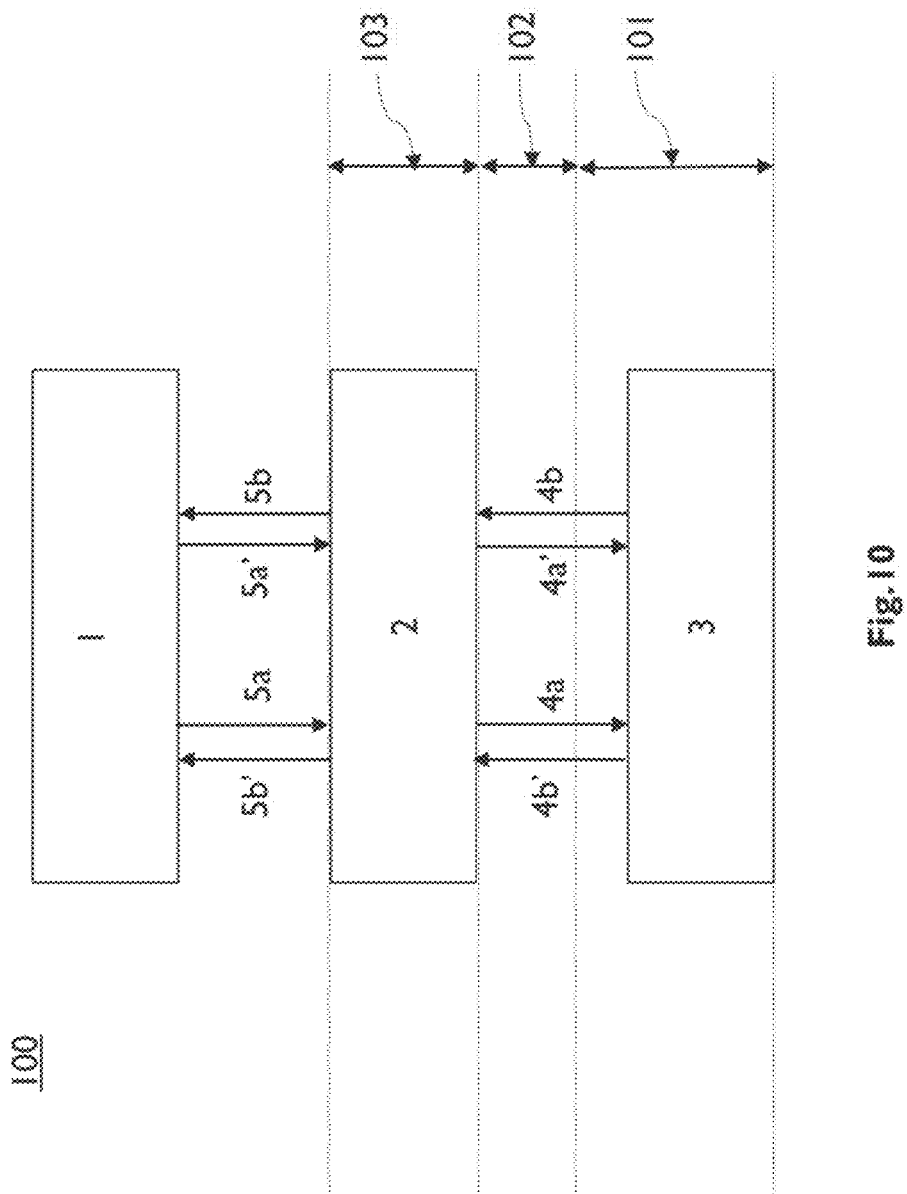

BRAIN-COMPUTER INTERFACE SYSTEM

CROSS-REFERENCE TO RELATED APPLICATIONS

The present application is a non-provisional patent application claiming priority to European Patent Application No. 20212668.6, filed Dec. 9, 2020, the contents of which are hereby incorporated by reference.

FIELD OF THE DISCLOSURE

The present disclosure is generally related to a brain-computer interface system and more specifically to a brain-computer interface system for high-throughput neural sensing/stimulation communication.

BACKGROUND

A brain-computer interface (BCI) system establishes a direct communication pathway between brain neural sensors and/or stimulators and external communication devices allowing a bidirectional information flow for researching, mapping, assisting, augmenting, or repairing human cognitive or sensory-motor functions.

A conventional technique for a brain-computer interface including a transmitter coil, a secondary coil and Neurograin ASICs using RF communication for power delivery and data transmission is disclosed in document "Wireless Power and Data Link for Ensembles of Sub-mm scale Implantable Sensors near 1 GHz", by Jihun Lee et al, 2018 IEEE Biomedical Circuits and Systems Conference (BioCAS), Cleveland, OH, 2018, pp. 1-4.

Another conventional technique for a brain-computer interface including an external transceiver, a sub-dural transceiver and multiple neural dust units using ultrasound communication for power delivery and data transmission is disclosed in document "Neural Dust An Ultrasonic, Low Power Solution for Chronic Brain Machine Interfaces", by Seo, Dongjin et al. arXiv: Neurons and Cognition (2013).

SUMMARY

The disclosure is set out in the appended set of claims.

According to an example embodiment, a brain-computer interface system is provided, comprising at least one data processing unit, a data transceiver unit, and a sensing and/or stimulation unit; a first communication path between the data transceiver unit and the sensing and/or stimulation unit comprising a first downlink channel for transmitting power and data from the data transceiver unit to the sensing and/or stimulation unit and a first uplink channel for transmitting data from the sensing and/or stimulation unit to the data transceiver unit; a second communication path between the data processing unit and the data transceiver unit comprising a second downlink channel for transmitting power and data from the data processing unit to the data transceiver unit and a second uplink channel for transmitting data from the data transceiver unit to the data processing unit; wherein the data transceiver unit is configured to be implanted into the cranium of a subject and the sensing and/or stimulation unit is configured to be implanted under the dura matter layer; and wherein the sensing and/or stimulation unit is configured to have high spatial integration to sensing and/or stimulating an area of the brain of the subject. According to an example embodiment, the dual-layer communication path of the brain-computer interface system in the present brain-computer interface system allows for both high power delivery efficiency and high data rate. According to an example embodiment, the high spatial integration unit is a microelectrode array unit. According to another example embodiment, the high spatial integration unit is a high density neuroprobe.

According to an example embodiment, the data transceiver unit and the sensing or stimulation unit are configured to fit in/through an opening of the cranium with an area of less than 1 square centimeter. According to an example embodiment, the small opening on the cranium allows for fast healing of the cranium. According to example embodiments such opening may be a cylinder-like opening, such as a circular cylinder having for example a circle base with an area of less than 1 cm$^2$. Other shapes for openings in the cranium are possible in which the surface area of the opening at the top or bottom of the cranium is less than 1 cm$^2$.

According to an example embodiment, the sensing or stimulation unit has a cross-section area that is equal to or smaller than the data transceiver unit. According to an example embodiment, the sensing or stimulation unit can be implanted through the same opening on the cranium used for locating the data transceiver unit to further reduce the damage to the body of the subject.

According to an example embodiment, the first uplink channel is configured as an intrabody conductive coupling communication. According to an example embodiment, the first downlink channel is configured as an ultrasound communication. According to an example embodiment, the second downlink channel is configured as an inductive communication and the second uplink channel is configured as an electromagnetic-based impulse-radio ultra-wideband communication.

According to an example embodiment, the sensing or stimulation unit is configured for sensing or stimulating a subcortical region of the brain.

According to an example embodiment, the data processing unit is located in a wearable device on the scalp or in an external hub.

According to an example embodiment, one data transceiver unit is configured to communicate with a plurality of sensing or stimulation units.

According to an example embodiment, one data processing unit is configured to communicate with a plurality of data transceiver units. According to an example embodiment, one data processing unit communicates with a plurality of data transceiver units via a transceiver gateway unit.

According to an example embodiment, the transceiver gateway unit is configured to be implanted between the scalp and the cranium and the communication between the transceiver gateway unit and the data transceiver units is a wired communication.

According to an example embodiment, one data processing unit is configured to communicate with at least one other data processing unit. According to an example embodiment, the data processing unit is configured to communicate with an external hub.

According to an example embodiment, the brain-computer interface system further comprises a secondary communication setup including a third uplink channel or a fourth uplink channel configured for safe mode communication. The safe mode communication provides a secondary communication when a primary communication channel is not stable or shut down.

According to an example embodiment, the brain-computer interface system further comprises a high-data-rate stimulation setup including a third downlink channel configured as an intrabody conductive coupling communication, and a fourth downlink channel configured as an electromagnetic-based impulse-radio ultra-wideband communication. The high-data-rate stimulation setup can stimulate the living being with high data rate.

According to an example embodiment, a method for arranging the brain-computer interface system is provided, comprising: creating an opening through the scalp and cranium of a subject to have access to a brain's sub-dural area; implanting a high spatial integration unit for neural sensing and/or stimulation to the brain's sub-dural area through the opening; implanting a data transceiver unit in the opening of the cranium; arranging a data processing unit above the cranium of the subject. The method limits the damage to the cranium of the subject and thus allows fast healing after the implantation of the high spatial integration unit and the data transceiver unit.

According to an example embodiment, a method for sensing or stimulating a brain area of a subject is provided. The method comprising: arranging a high spatial integration unit for sensing or stimulating the brain area of interest under the brain's dura mater layer; arranging a data transceiver unit into the cranium of the subject; arranging a data processing unit above the cranium; establishing a first communication path between the data transceiver unit and the sensing or stimulation unit comprising a first downlink channel for transmitting power and data from the data transceiver unit to the data sensing unit and a first uplink channel for transmitting data from the sensing or stimulation unit to the data transceiver unit; establishing a second communication path between the data processing unit and the data transceiver unit comprising a second downlink channel for transmitting power and data from the data processing unit to the data transceiver unit and a second uplink channel for transmitting data from the data transceiver unit to the data processing unit. The method can guarantee high power delivery efficiency and high data rate while keeping brain tissue damage restricted under allowance levels.

These as well other aspects and alternatives of the brain computer interface system will become apparent to those of ordinary skill in the art by reading the following description, with reference where appropriate to the accompanying drawings.

BRIEF DESCRIPTION OF THE FIGURES

The above, as well as additional, features will be better understood through the following illustrative and non-limiting detailed description of example embodiments, with reference to the appended drawings.

FIG. 2 shows an example block diagram of a brain-computer interface system with a plurality of sensing or stimulation units.

FIG. 3 shows an example block diagram of a brain-computer interface system with a plurality of data transceiver units.

FIG. 4 shows an example block diagram of a brain-computer interface system with a distribution network for the data transceiver units.

FIG. 5 shows an example block diagram of a brain-computer interface system with a distribution network for the data processing units.

FIG. 6 shows an example block diagram of a brain-computer interface system communicating with an external hub.

FIG. 10 shows another example block diagram of a brain-computer interface system.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
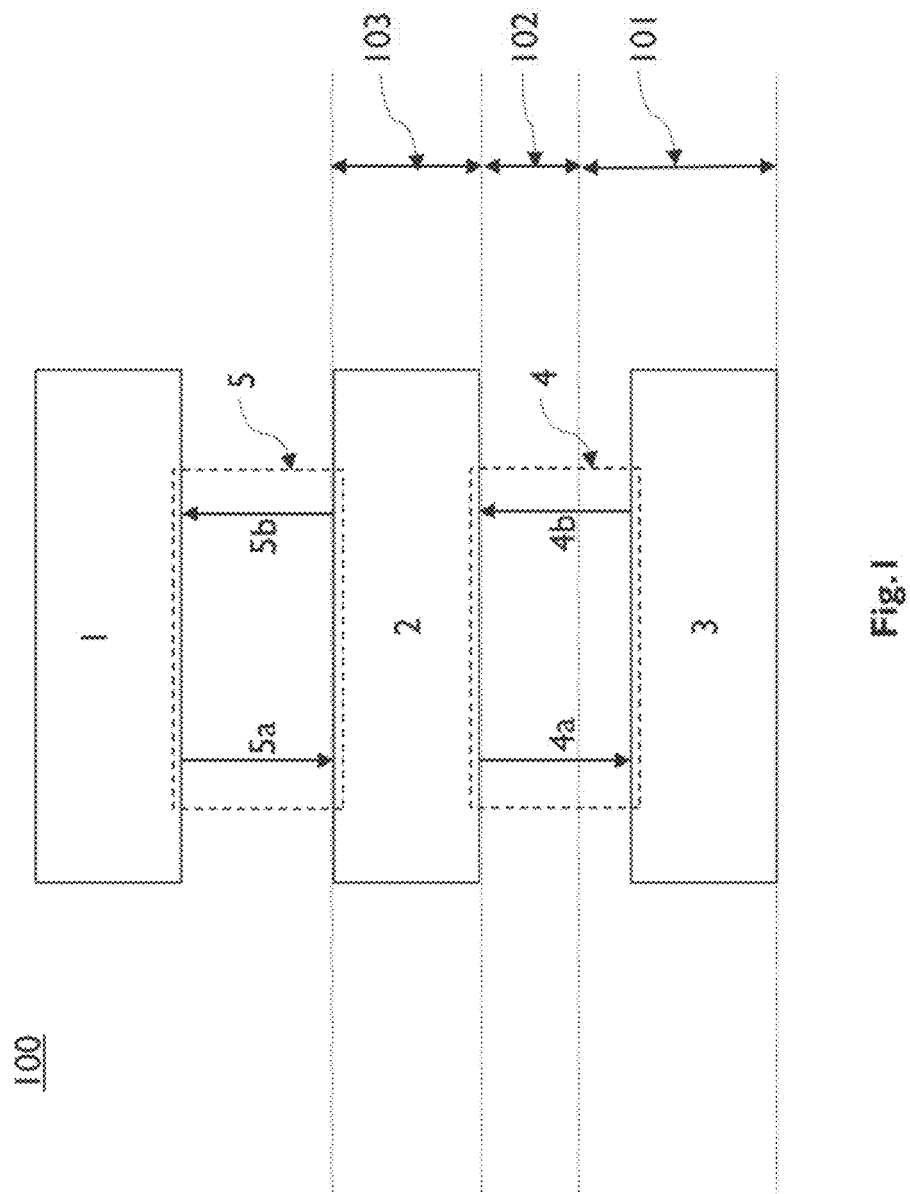
FIG. 1 shows an example block diagram of a brain-computer interface system.

FIG. 1 shows an example block diagram of a brain-computer interface system 100 for a living being. The brain-computer interface system 100 comprises a data processing unit 1, a data transceiver unit 2, a sensing or stimulation unit 3, a first communication path 4 and a second communication path 5. The data processing unit 1 is configured to be located above the cranium 103 of the subject, the data transceiver unit 2 is configured to be implanted into the cranium 103 of the subject and the sensing or stimulation unit 3 is configured to be implanted under the brain's dura mater layer 102 of the subject.

According to an example, the first communication path 4 is a transdural communication between the data transceiver unit 2 and the sensing or stimulation unit 3 and comprises separate channels for downlink and uplink communication: a first downlink channel 4a and a first uplink channel 4b. The first downlink channel 4a is configured for power delivery and data transmission, wherein the data comprises, for example, command signals or clock signals. The command signals may comprise stimulation signals. The first uplink channel 4b is configured for data transmission.

According to an example, the second communication path 5 is a transcutaneous communication between the data transceiver unit 2 and the data processing unit 1 and comprises separate channels for downlink and uplink communication: a second downlink channel 5a and a second uplink channel 5b. The second downlink channel 5a is configured for power delivery and data transmission, wherein the data comprises, for example, command signals or clock signals. The second uplink channel 5b is configured for data transmission.

Having separate channels for downlink and uplink communication for both first and second communication paths 4, 5 allows choosing a different communication method, for example, with two different carriers configured with different frequencies/bandwidth and therefore different data rate and power transmission efficiencies for the downlink and uplink communication. The downlink communication is used to deliver maximum power while having relatively low profile for data rate communication to transmit signals such as clock signals or command signals. The uplink communication is used to deliver high data rate communication comprising high resolution raw or processed data. Thus, the present brain-computer interface system 100 guarantees maximum power delivery efficiency and maximum high data rate while brain tissue damage is restricted under allowance levels according to the specific absorption rate (SAR) recommendations.

The sensing or stimulation unit 3 may be configured to be implanted into the brain's sub-dural area 101. According to an example embodiment, the high spatial integration unit is a microelectrode array (MEA), for example, a commercially available Utah array. According to an example embodiment, the sensing or stimulation unit 3 is configured to have high spatial integration as described in document "Novel electrode technologies for neural recordings" Hong, G et al, Nat Rev Neurosci 20, 330-345 (2019) to sense or stimulate an area of the brain of the subject. According to an example embodiment, the sensing or stimulation unit 3 is a high density neuroprobe. "High spatial integration sensing or stimulating unit" and "high spatial integration unit" are interchangeable in the description. The high spatial integration sensing or stimulation unit enables a substantial increase in the number of single neurons that can be monitored and/or stimulated simultaneously for further understanding the coordinated activities underlying brain functions. High spatial integration allows high spatial temporal resolution with large volume coverage. For example, the sensing or stimulation unit 3 has a dense recording electrode array providing more than 100 recording channels for sensing or stimulation to monitor the spiking activity from more than 100 neurons and/or stimulate a plurality of them. According to an example embodiment, the sensing and/or stimulation unit 3 has a dense recording electrode array providing at least 1000 recording channels. The combination of dense recording sites and high channel count yields well-isolated spiking activity from hundreds of neurons per sensing site of the sensing or stimulation unit 3. The voltage signals from the spiking activity are filtered, amplified, multiplexed, and digitized on the base area of the unit, allowing noise-free digital data transmission. According to an example embodiment, the electrodes and electronics in the sensing or stimulation unit 3 are implemented on a probe having small cross-sectional area to minimize brain tissue damage. According to an example embodiment, the sensing or stimulation unit may be configured as a high-density active silicon MEA (microelectrode array), e.g. a Neuropixels probe as described in document "22.7 *A 966-electrode neural probe with* 384 *configurable channels in* 0.13 µm *SOI CMOS*", C. M. Lopez et al., 2016 IEEE International Solid-State Circuits Conference (ISSCC), San Francisco, CA, 2016, pp. 392-393 and/or in document "*Fully integrated silicon probes for high-density recording of neural activity*", Jun, J., Steinmetz, N., Siegle, J. et al. Nature 551, 232-236 (2017). The high-density active silicon MEA comprises a fully-integrated silicon CMOS digital neural probe with on-chip circuitry for signal conditioning and digitization. Each probe features 384 dual-band, low-noise recording channels that can individually be configured to simultaneously record AP (action potential) and LFP (local field potential) signals from 960 selectable, low-impedance TiN electrodes densely tiled along a 10-mm long, 70×24 µm cross-section straight shank.

The sensing and/or stimulation unit 3 is implanted in the brain's sub-dural area 101 below the brain's dura mater through an opening on the subject's cranium 103. The data transceiver unit 2 is implanted into the opening on the cranium 103 after placing the sensing or stimulation unit 3.

In the present brain-computer interface system 100, the data transceiver unit 2 is implanted in the subject's cranium 103 and is configured to relay data and power between the data processing unit 1 and the sensing or stimulation unit 3. Therefore, the downlink power delivery efficiency from the data processing unit 1 to the sensing or stimulation unit 3 is highly increased via the data transceiver unit 2 in the cranium. Besides, the uplink communication has low requirement for power transmission in order to deliver high data rate measurement data from the sensing or stimulation unit 3 to the data processing unit 1 via the data transceiver unit 2 in the cranium. Thus, more data can be transmitted for the same amount of transmission power compared to the existing solutions. In addition, a lower power loss on the communication path allows more power to be delivered to the sensing or stimulation unit 3 while having relatively low damage both to the body and brain tissue. Notably, since less transmission power is required for transmitting data in the uplink communication, the system allows for high data rate and throughput from the sensing or stimulation unit 3 to be delivered for analysis. The high efficiency on power and data transmission also allows using a smaller data transceiver unit 2 or sensing or stimulation unit 3. According to an example embodiment, at least 15 mW of power can be delivered to the sensing or stimulation unit 3. At the same time, the uplink data communication also highly increases the data rate to have high spatial resolution on neurons. According to an example embodiment, a data rate of at least 10 Mbps is used for sending data from the sensing or stimulation unit 3. Considering SAR regulation recommendations, either the downlink power transmissions or the implants generate less than two degrees of tissue heating.

According to an example embodiment, the data transceiver unit 2 is configured to fit in/through an opening of a cranium cylindrical area of less than one square centimeter. According to an example embodiment, the data transceiver unit 2 is configured to fit in/through an opening of a cranium cylindrical area with a diameter of less than 14 mm for burr-hole craniotomy or for twist-drill craniotomy. Compared to the conventional large-area craniotomies, a small opening area on the cranium allows fast healing after the implantation. According to an example embodiment, the data transceiver unit 2 is configured to fit in a cranium cylindrical opening with a diameter of less than 5 mm further limiting the damage to the living being and allowing faster healing. According to an example embodiment, the data transceiver unit 2 comprises a rechargeable battery.

According to an example embodiment, the sensing or stimulation unit 3 is configured to fit in/through an opening of a cranium cylindrical area of less than one square centimeter. According to an example embodiment, the sensing or stimulation unit 3 is configured to fit in/through an opening of a cranium cylindrical area with a diameter of equal to or less than 14 mm for burr-hole craniotomy or for twist-drill craniotomy. According to an example embodiment, the sensing or stimulation unit 3 has a cross-section area that is equal to or smaller than the data transceiver unit 2. According to an example embodiment, the sensing and/or stimulation unit 3 has diameter that is smaller than the diameter of the data transceiver unit 2. Thus, the sensing and/or stimulation unit 3 can be allocated into the sub-dural area 101 through the small cranium opening area before implanting the data transceiver unit 2 in the cranium opening of subject's cranium. Reusing the small cranium opening area avoids a big opening area on the cranium and further reduces the possibility of infection and damage to the brain tissue and cranium.

According to an example embodiment, the first uplink channel 4b is configured to use intrabody conductive coupling communication between the data transceiver unit 2 and the sensing or stimulation unit 3 to allow, for example, at least a data rate of 10 Mbps. Raw and/or processed data is sent from the sensing or stimulation unit 3 to the data transceiver unit 2 while keeping the power consumption under allowance according to the SAR recommendations. The intrabody conductive coupling communication in the present brain-computer interface system 100 is configured as a transdural communication between the implanted sensing or stimulation unit 3 and the implanted data transceiver unit 2.

According to an example, at least one pair of antennas are configured to be integrated on each data transceiver unit 2 and sensing or stimulation unit 3. According to an example embodiment, the transmission bandwidth between the data transceiver unit 2 and sensing or stimulation unit 3 is above 100 MHz. According to an example embodiment, the antennas can be configured as electrodes. At least one pair of electrodes is configured to be implemented on the data transceiver unit 2 towards the direction of sensing or stimulation unit 3 and another pair of electrodes is configured to be implemented on the sensing or stimulation unit 3 towards the direction of data transceiver unit 2. According to an example embodiment, the potential difference created by a current flow between the electrode pair on the sensing or stimulation unit 3 will be sensed by the electrode pair on data transceiver unit 2. The dura mater layer 102 usually has a thickness of between 1 and 4 mm. In the sub-dural area 101, a layer of cerebrospinal fluid (CSF) with a thickness of 3-5 mm is present between the dura mater layer 102 and the sensing or stimulation unit 3. The data can be efficiently transmitted between the pair of electrodes on the data transceiver unit 2 and the sensing or stimulation unit 3 across the CSF and dura mater layer 102. According to an example embodiment, the diameter of each electrode is 1 mm, and the inter-electrode center-to-center distance is 10 mm.

The intrabody conductive coupling communication is a reliable wireless communication which also reduces the possibility of infection or damage to the brain tissue. According to an example embodiment, a high-density active silicon MEA (microelectrode array) with more than 100 electrodes, e.g. a Neuropixels probe, is configured as the sensing or stimulation unit 3. According to example embodiments, the Neuropixels probe may have up to 1000 electrodes, whereas the data rate may reach 300 Mbps.

According to an example embodiment, the first downlink channel 4a is configured as an ultrasound communication to deliver power and low data rate communication. The low data rate communication may comprise clock signals and/or command/control signals sent from the data transceiver unit 2 to the sensing or stimulation unit 3.

According to an example embodiment, the second downlink channel 5a is configured as an inductive communication and the second uplink channel 5b is configured as an electromagnetic-based impulse-ratio ultra-wideband (EM-based IR-UWB) communication. The communication between the data processing unit 1 and the data transceiver unit 2 uses inductive communication as downlink communication to achieve high power transfer efficiency and EM based IR-UWB as uplink communication to achieve a high bandwidth of over 100 MHz and high data rate over 10 Mbps.

According to an example embodiment, the sensing or stimulation unit 3 is configured for sensing and/or stimulating a cortical and/or subcortical region of the brain. The subcortical region acts as information hubs of the nervous system, as they relay and modulate information passing to different areas of the brain. Electrical brain stimulation and sensing with multiple sensing and/or stimulation units can be used for functional mapping one or more locations in the brain. According to an example embodiment, the sensing or stimulation unit 3 comprises a high-density active silicon MEA probe.

According to an example embodiment, the data processing unit 1 is located in a wearable device on the scalp of the subject or in an external hub 200. The wearable device or the external hub 200 may be further equipped with a rechargeable battery connected to the data processing unit 1 to deliver power to and/or exchange data with the data processing unit 1. The wearable device may be placed also above the scalp, e.g. as a helmet. According to an example embodiment, the data processing unit 1 further comprises a data acquisition module.

FIG. 2 shows an example block diagram of a brain-computer interface system 100 for a living being with a plurality of sensing and/or stimulation units. The brain-computer interface system 100 comprises a data processing unit 1, a data transceiver unit 2, a plurality of sensing and/or stimulation units 31, 32, a plurality of first communication paths 41, 42 and a second communication path 5. According to an example embodiment, one data transceiver unit 2 is configured to communicate with a plurality of sensing and/or stimulation units 31, 32. The data transceiver unit 2 is configured to communicate with the first sensing and/or stimulation unit 31 via the corresponding first communication path 41. The data transceiver unit 2 is configured to communicate with the second sensing and/or stimulation unit 32 via the other corresponding first communication path 42.

FIG. 3 shows an example block diagram of a brain-computer interface system 100 for a living being with a plurality of data transceiver units. The brain-computer interface system 100 comprises a data processing unit 1, a plurality of data transceiver units 21, 22, a plurality of second communication paths 51, 52, a plurality of sensing and/or stimulation units 33, 34, and a plurality of first communication paths 41, 42.

According to an example embodiment, one data processing unit 1 is configured to communicate with the first data transceiver unit 21 via the second communication path 51 and to communicate with the second data transceiver unit 22 via the other second communication path 52. The first data transceiver unit 21 is further configured to communicate with the first sensing and/or stimulation unit 33 via the first communication path 41. The second data transceiver unit 22 is further configured to communicate with the second sensing and/or stimulation unit 34 via the other first communication path 42. According to an example embodiment, the data transceiver units 21, 22 may first process and manipulate the data from the sensing and/or stimulation units and send the processed data to the data processing unit 1. According to an example embodiment, at least one of the data transceiver units 21, 22 are configured to communicate with a plurality of sensing and/or stimulation units.

FIG. 4 shows an example block diagram of a brain-computer interface system 100 for a living being, with a distribution network for the data transceiver units. The brain-computer interface system 100 comprises a data processing unit 1, a transceiver gateway unit 23, a plurality of data transceiver units 21, 22, a second communication path 5, a plurality of sensing and/or stimulation units 31, 32, and a plurality of first communication paths 41, 42. The data processing unit 1 is configured to be located above the scalp 104 of the subject, the transceiver gateway unit 23 is configured to be implanted below the scalp 104, the data transceiver units 21, 22 are configured to be implanted into the cranium 103 of the subject and the sensing and/or stimulation units 31, 32 are configured to be implanted under the brain's dura mater layer 102.

According to an example embodiment, one data processing unit communicates with a plurality of data transceiver units via a transceiver gateway unit 23. The transceiver gateway unit 23 is configured to communicate with the data transceiver units 21, 22. The transceiver gateway unit 23 is configured to communicate with the data processing unit 1 via the second communication path 5. The data transceiver unit 21 is configured to communicate with the sensing and/or stimulation unit 31 via the first communication path 41. The data transceiver unit 22 is configured to communicate with the sensing and/or stimulation unit 32 via the other first communication path 42. According to an example embodiment, at least one of the data transceiver units 21, 22 are configured to communicate with a plurality of sensing and/or stimulation units. According to an example embodiment, the transceiver gateway unit 23 may first process and manipulate the data from the data transceiver units 21, 22 and send the processed data to the data processing unit 1.

According to an example embodiment, the transceiver gateway unit 23 is located between the scalp and the cranium, e.g. the fat between the scalp 104 and the cranium 103; the communication between the transceiver gateway unit 23 and the data transceiver units 21, 22 is a wired communication. According to another example embodiment, the communication between the transceiver gateway unit 23 and the data transceiver units 21, 22 is a wireless communication.

FIG. 5 shows an example block diagram of a brain-computer interface system 100 for a living being, with a distribution network of the data processing units. The brain-computer interface system 100 comprises a plurality of data processing units 11, 12, 13, a plurality of data transceiver units 21, 22, a plurality of second communication paths 51, 52, a plurality of sensing and/or stimulation units 31, 32, and a plurality of first communication paths 41, 42.

According to an example embodiment, one data processing unit 13 is configured to communicate with at least one of the other data processing units 11, 12. The data processing unit 11 is configured to communicate with the data transceiver unit 21 via the second communication path 51 and to communicate with the data transceiver unit 22 via the second communication path 52. The data transceiver unit 21 is further configured to communicate with the sensing and/or stimulation unit 31 via the first communication path 41. The data transceiver unit 22 is further configured to communicate with the sensing and/or stimulation unit 32 via the first communication path 42. According to an example embodiment, the data processing unit 11, 12 may first process and manipulate the data from the data transceiver units and send the processed data to the data processing unit 13. According to an example embodiment, at least one of the data transceiver units 21, 22 are configured to communicate with a plurality of sensing and/or stimulation units. According to an example embodiment, at least one data processing unit are configured to communicate with a plurality of data transceiver units.

FIG. 6 shows an example block diagram of a brain-computer interface system 100 for a living being communicating with an external hub 200.

According to an example embodiment, the data processing unit 1 in the brain-computer interface system 100 is configured to communicate with an external hub 200. According to an example embodiment, the data processing unit 1 in the brain-computer interface system 100 is located in a wearable device to deliver power to and receive data from the data transceiver unit(s). The external hub 200 may be equipped to further power the data processing unit 1 wirelessly or perform complex data processing on the received data.

Figure 7:
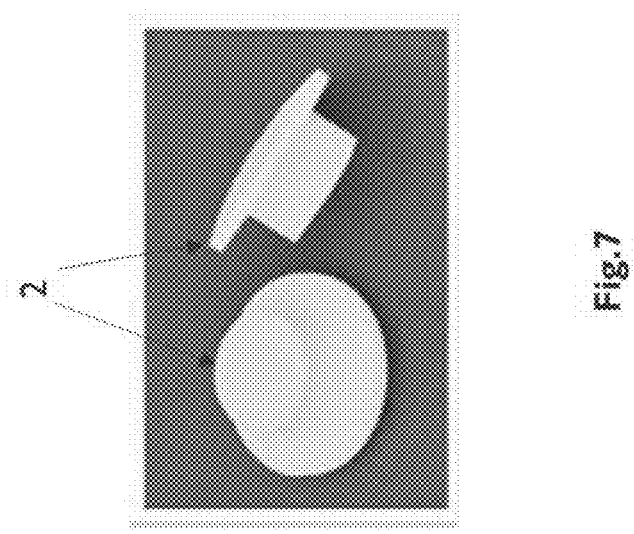
FIG. 7 shows an example illustration of a data transceiver unit configured for a cranial implant.

FIG. 7 shows an example illustration of a data transceiver unit 2 configured for a cranial implant. According to an example embodiment, the data transceiver unit 2 may further comprise a protrusion cap on the side towards the data processing unit 1. The diameter of the protrusion cap can be slightly larger than the diameter of the opening on the skull. According to an example embodiment, the diameter of the protrusion cap is 20%, and in some examples 10%, larger than the diameter of the opening on the skull.

Figure 8:
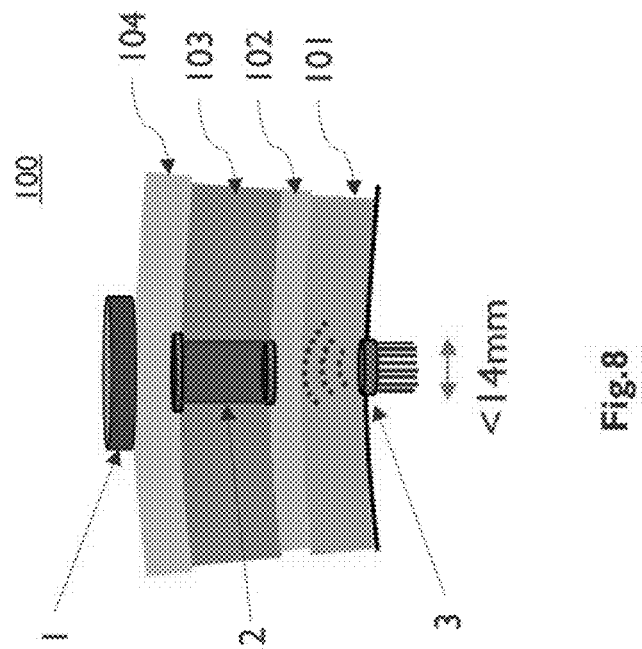
FIG. 8 shows another example of a brain-computer interface system according to the present description.

FIG. 8 shows another example of a brain-computer interface system 100 according to the present description. The brain-computer interface system 100 comprises a data processing unit 1 located above the cranium 103 of the subject, a data transceiver unit 2 located in the cranium 103 of the subject, and a sensing and/or stimulation unit 3 located in the sub-dural area 101 under the brain's dura mater layer 102 of the subject. Neuroscience studies demand more and more data sensed from the brain and in high resolution. In conventional solutions, transmission of the data and/or power between a sensing and/or stimulation unit and an external processing unit has low transmission efficiency due to the existence of the skull. To overcome the low transmission efficiency and still reach high resolution data stream and enough power to support the sensing and/or transmission, the conventional solutions need to increase the power to be transmitted and transmit stronger data signal, e.g. having higher amplitude for data to be transmitted. However, this will increase the heat dissipation to the tissue of the living being. To avoid damage to the living being, the tissue heating due to heat dissipation during the transmission and in operation of the devices should be strictly limited to below 2 degrees. More specifically, the Specific Absorption Rate (SAR) shall be limited to 2 W/kg in Europe and 1.6 W/kg in US according to the US Federal Communications Commission (FCC). The present disclosure overcomes these barriers and proposes a system providing high resolution data transmission and at the same time operate safely in a living being. The present disclosure therefore has low risk wound management and allows fast healing after implant surgery. The opening on the skull for the data transceiver unit 2 is first used for implanting the sensing and/or stimulation unit on the brain of the subject as a subdural implant. After implanting the sensing and/or stimulation unit 3, the data transceiver unit 2 is implanted in the opening. The opening on the skull may be a cranium cylindrical opening with a diameter of equal to or less than 1 cm, in some examples equal to or less than 14 mm. The diameter of the data transceiver unit 2 is therefore also equal to or less than 1 cm, in some examples equal to or less than 14 mm. According to an example embodiment, the sensing and/or stimulation unit 3 comprises a neuroprobe inserted inside the brain tissue of the subject. According to an example embodiment, the data transceiver unit 2 and the sensing and/or stimulation unit 3 are paired during configuration. The data processing unit 1 and the data transceiver unit 2 are also paired during configuration. During operation, the data processing unit 1 transmits power to the data transceiver unit 2 and further the data transceiver unit 2 transmits the power to the sensing and/or stimulation unit 3. The power can be continuously provided from the data processing unit 1 or can be provided with pulses. The power can be optionally saved in a rechargeable battery. During operation, the data processing unit 1 transmits control signals to the data transceiver unit 2 and the data transceiver unit 2 further transmits control signals to the sensing and/or stimulation unit 3. The control signal may comprise low data-rate stimulation commands. During operation, the sensing and/or stimulation unit 3 transmits data to the data transceiver unit 2 and further the data transceiver unit 2 transmits the data to the data processing unit 1. The communication between the sensing and/or stimulation unit 3 and the data transceiver unit 2 is a wireless communication and has a high power and data delivery efficiency while the heat dissipation is highly limited because the power loss and the data loss are low in the dura mater layer 102 and sub-dural area 101. The communication between the data transceiver unit 2 and the data processing unit 1 may be a wireless or wired communication through the fat and/or scalp above the cranium 103 of the subject.

The present disclosure presents low health risks during implantation and operation. This also allows the sensing and/or stimulation of large brain areas. According to an example embodiment, the system comprises several sensing and/or stimulation locations spreading among the entire left/right brain area.

Figure 9:
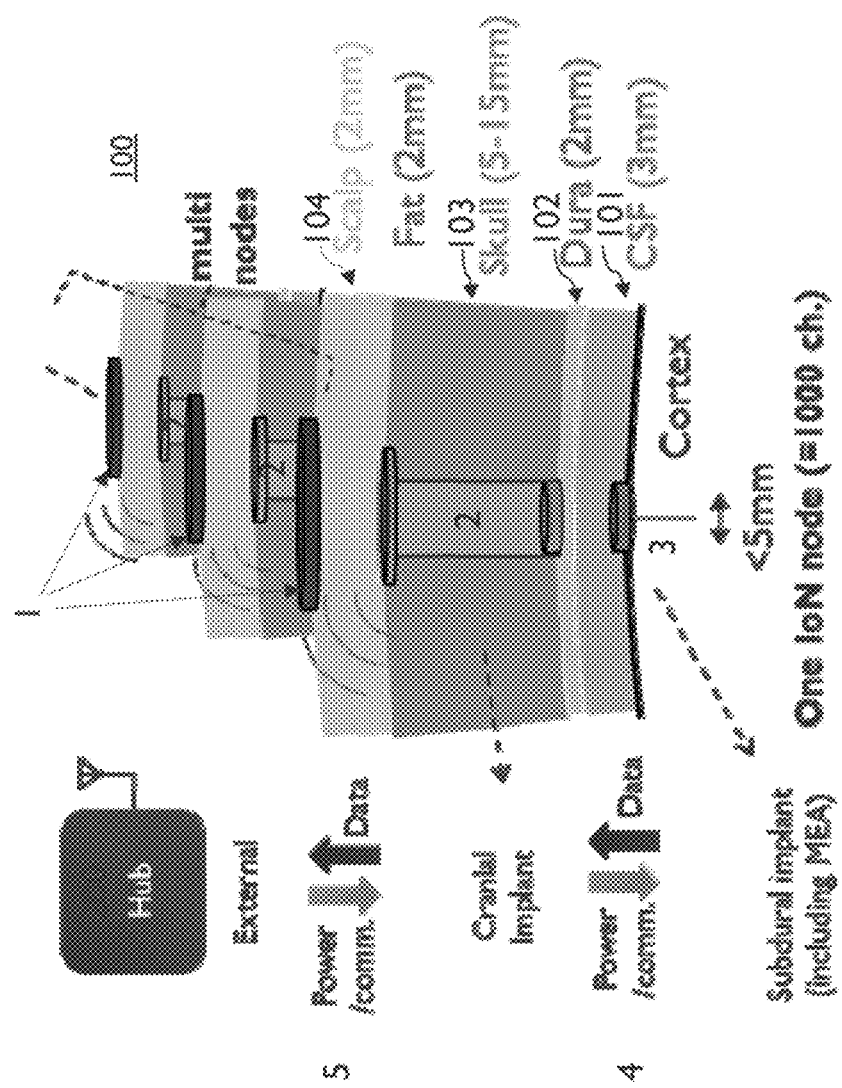
FIG. 9 shows a further example of a brain-computer interface system according to the present description.

FIG. 9 shows a further example of a brain-computer interface system 100. The brain-computer interface system 100 comprises a plurality of data processing units 1, a plurality of data transceiver units 2, a plurality of sensing and/or stimulation units 3 (not all shown in the figure). The plurality of sensing and/or stimulation units 3 are placed on the brain area of interest. The different brain areas of interest may be located far away from each other. According to an embodiment each of the plurality of data transceiver units 2 communicating with one or more sensing and/or stimulation units 3 is placed on the skull area above the brain areas of interest. The corresponding one or more data processing units 1 communicating with one or more transceiver units 2 can be placed above the corresponding transceiver units 2. The plurality of data processing units 1 may be placed on the scalp, such as on a helmet and/or placed in an external hub which has no physical contact with the scalp. The data processing units 1 may communicate with each other. According to an example embodiment, one or more data processing units may process and/or compress data from other data processing units. The system 100 allows not only extracting data related to local brain activity and/or stimulating a brain area locally, including intra and inter neuron communication but also extracting data related to brain activity in wider areas and/or stimulating at multiple different brain areas in a large area, even in half or the entire brain area.

FIG. 10 shows another example block diagram of a brain-computer interface system 100 for a living being. The brain-computer interface system 100 comprises a data processing unit 1, a data transceiver unit 2, a sensing or stimulation unit 3, a plurality of uplink communication channels 4b, 4b', 5b, 5b' and a plurality of downlink communication channels 4a, 4a', 5a, 5a'. The data processing unit 1 is configured to be located above the cranium 103 of the subject, the data transceiver unit 2 is configured to be implanted into the cranium 103 of the subject and the sensing or stimulation unit 3 is configured to be implanted under the brain's dura mater layer 102 of the subject.

According to an example embodiment, the brain-computer interface system comprises a high-data-rate stimulation setup including a third downlink channel 4a' configured as intrabody conductive coupling communication and a fourth downlink channel 5a' configured as an electromagnetic-based impulse-radio ultra-wideband communication. In operation, the brain-computer interface system 100 can be used in different modes. In one example, only stimulation is applied in the brain-computer interface system 100 in a certain period of time. In another example, the brain-computer interface system 100 only senses in an area of the brain tissue of the living being in a certain period of time. In another example, the stimulation is applied when the brain tissue of the living being is sensed simultaneously with high data rate by using the high-data-rate stimulation setup.

According to an example embodiment, the brain-computer interface system comprises a primary communication setup including a first downlink channel 4a configured as an ultrasound communication, a first uplink channel 4b configured as an intrabody conductive coupling communication, a second downlink channel 5a configured as an inductive communication and a second uplink channel 5b configured as an EM-based IR-UWB communication.

According to an example embodiment, the brain-computer interface system further comprises a secondary communication setup including a third uplink channel 5b' configured as an inductive communication. According to an example embodiment, the secondary communication setup may comprise a fourth uplink channel 4b' configured as an ultrasound communication. The secondary communication setup is used as a safe mode communication when the uplink communication of the primary communication setup is partially or fully malfunctioning. The secondary communication setup may use a lower data rate compared to the uplink channel in the primary communication setup.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A brain-computer interface system configured for use with a subject, the subject including a cranium and a brain, the brain having a dura mater and cerebrospinal fluid, comprising:
   at least one data processing unit, at least one data transceiver unit, and at least one sensing or stimulation unit,
   wherein the data processing unit is configured to be external to the cranium of the subject, the data transceiver unit is configured to be implanted into the cranium of the subject, and the sensing or stimulation unit is configured to be implanted under the dura mater of the brain;
   a first communication path between the data transceiver unit and the sensing or stimulation unit comprising a first downlink channel transmitting power and data from the data transceiver unit to the sensing or stimulation unit and a first uplink channel transmitting data from the sensing or stimulation unit to the data transceiver unit, wherein the first uplink channel and the first downlink channel employ different communication methods such that a data rate for the first uplink channel is greater than a data rate for the first downlink channel, and wherein the first uplink channel is an intrabody conductive coupling communication channel configured to transmit data through the dura mater and cerebrospinal fluid via (i) a pair of first electrodes disposed on the data transceiver unit toward the sensing or stimulation unit, wherein the first electrodes are configured to be disposed within or under the cranium of the subject, and (ii) a pair of second electrodes disposed on the sensing or stimulation unit toward the data transceiver unit, wherein the second electrodes are configured to be disposed under the cranium of the subject, wherein the first downlink channel is an intrabody ultrasound communication channel; and a second communication path between the data processing unit and the data transceiver unit comprising a second downlink channel transmitting power and data from the data processing unit to the data transceiver unit and a second uplink channel transmitting data from the data transceiver unit to the data processing unit, wherein the second downlink channel is an inductive communication channel, the second uplink channel is an electromagnetic-based impulse-radio ultra-wideband communication channel, and the sensing or stimulation unit is a high spatial integration unit for sensing or stimulating a brain area.

2. The brain-computer interface system according to claim 1, wherein the data transceiver unit and the sensing or stimulation unit are configured to fit in/through a cranium opening with an area of less than 1 cm$^2$.

3. The brain-computer interface system according to claim 1, wherein the sensing or stimulation unit has a cross-section area that is equal to or smaller than the data transceiver unit.

4. The brain-computer interface system according to claim 1, wherein the sensing or stimulation unit is a high-density active silicon microelectrode array probe.

5. The brain-computer interface system according to claim 1, wherein the ultrasound communication channel is configured to convey clock signals or command signals.

6. The brain-computer interface system according to claim 1, wherein a data rate of the first uplink channel is at least 10 Mbps and wherein a data rate of the second uplink channel is at least 10 Mbps.

7. The brain-computer interface system according to claim 1, wherein the sensing or stimulation unit is configured for sensing or stimulating a subcortical region of the brain.

8. The brain-computer interface system according to claim 1, wherein the subject has a scalp over the cranium and the data processing unit is located in a wearable device on the scalp or in an external hub.

9. The brain-computer interface system according to claim 1, wherein one data transceiver unit is configured to communicate with a plurality of sensing or stimulation units.

10. The brain-computer interface system according to claim 1, wherein one data processing unit is configured to communicate with a plurality of data transceiver units.

11. The brain-computer interface system according to claim 10, wherein one data processing unit communicates with a plurality of data transceiver units via a transceiver gateway unit.

12. The brain-computer interface system according to claim 1, wherein one data processing unit is configured to communicate with at least one other data processing unit.

13. The brain-computer interface system according to claim 1, wherein the data processing unit is configured to communicate with an external hub.

14. The brain-computer interface system according to claim 1, further comprising a secondary communication setup including at least one of (i) a third uplink channel between the data transceiver unit and the sensing or stimulation unit that employs a different communication method from the first uplink channel or (ii) a fourth uplink channel between the data processing unit and the data transceiver unit that employs a different communication method from the second uplink channel configured for safe mode communication.

15. The brain-computer interface system according to claim 1, wherein an inter-electrode center-to-center distance between the pair of first electrodes is 10 mm.

16. The brain-computer interface system according to claim 1, wherein the data transceiver unit includes a rechargeable battery.

17. A method for sensing or stimulating a brain area of a subject, the subject including a cranium and a brain with a dura mater layer, the method comprising:

arranging a high spatial integration unit for sensing or stimulating the brain area of interest under the dura mater layer of the brain;

arranging a data transceiver unit into the cranium of the subject;

arranging a data processing unit above the cranium;

establishing a first communication path between the data transceiver unit and the sensing or stimulation unit comprising a first downlink channel for transmitting power and data from the data transceiver unit to the data sensing unit and a first uplink channel for transmitting data from the sensing or stimulation unit to the data transceiver unit, wherein the first uplink channel and the first downlink channel employ different communication methods such that a data rate for the first uplink channel is greater than a data rate for the first downlink channel, and wherein the first uplink channel is configured as an intrabody conductive coupling communication channel through the dura mater layer and a cerebrospinal fluid layer via (i) first electrodes disposed on the data transceiver unit toward the sensing or stimulation unit, wherein the first electrodes are disposed within or under the cranium of the subject, and (ii) second electrodes disposed on the sensing or stimulation unit toward the data transceiver unit, wherein the second electrodes are disposed under the cranium of the subject; and establishing a second communication path between the data processing unit and the data transceiver unit comprising a second downlink channel for transmitting power and data from the data processing unit to the data transceiver unit and a second uplink channel for transmitting data from the data transceiver unit to the data processing unit, wherein the first downlink channel is an intrabody ultrasound communication channel, the second downlink channel is an inductive communication channel, and the second uplink channel is an electromagnetic-based impulse-radio ultra-wideband communication channel.

\* \* \* \* \*